US009942337B2

(12) United States Patent
Orioli et al.

(10) Patent No.: US 9,942,337 B2
(45) Date of Patent: Apr. 10, 2018

(54) SYSTEM AND METHOD FOR CONTINUOUSLY MONITORING AND SEARCHING SOCIAL NETWORKING MEDIA

(71) Applicant: HITACHI DATA SYSTEMS CORPORATION, Santa Clara, CA (US)

(72) Inventors: Andrea Orioli, New York, NY (US); Umberto Malesci, Milan (IT); Alessandro Erta, Barbarasco Tresana (IT); Gianni Rosa Gallina, Sant' Antonino di Susa (IT)

(73) Assignee: HITACHI DATA SYSTEMS CORPORATION, Santa Clara, CA (US)

( * ) Notice: Subject to any disclaimer, the term of this patent is extended or adjusted under 35 U.S.C. 154(b) by 0 days.

(21) Appl. No.: 14/933,491

(22) Filed: Nov. 5, 2015

(65) Prior Publication Data

US 2016/0164987 A1 Jun. 9, 2016

Related U.S. Application Data

(63) Continuation of application No. 13/733,672, filed on Jan. 3, 2013, now Pat. No. 9,203,915.

(51) Int. Cl.
*H04L 29/08* (2006.01)
*H04L 12/58* (2006.01)
*H04L 29/06* (2006.01)

(52) U.S. Cl.
CPC ............ *H04L 67/22* (2013.01); *H04L 51/046* (2013.01); *H04L 51/20* (2013.01); *H04L 51/32* (2013.01); *H04L 65/4084* (2013.01)

(58) Field of Classification Search
CPC ....... H04L 51/046; H04L 51/20; H04L 51/32; H04L 65/4084; H04L 67/22
See application file for complete search history.

(56) References Cited

U.S. PATENT DOCUMENTS

2006/0247944 A1* 11/2006 Calusinski, Jr. ....... G06Q 40/00
                                                               705/1.1
2008/0215607 A1*  9/2008 Kaushansky .......... G06Q 30/02
(Continued)

FOREIGN PATENT DOCUMENTS

WO    2012/171073 A1    12/2012
WO       2010171073       12/2012

OTHER PUBLICATIONS

Communication Pursuant to Article 94(3) EPC received in corresponding European Application No. 13 151 951.4 dated Jun. 3, 2016.

(Continued)

*Primary Examiner* — Michael C Lai
(74) *Attorney, Agent, or Firm* — Mattingly & Malur, PC

(57) ABSTRACT

A system for continuously monitoring and searching social networking media allowing at least one client to access the system through a respective connection link and for connecting to at least one social networking media through a connection link. The system further comprises a connecting module comprising at least one connecting unit to connect to the at least one social network media for receiving continuously for a time selected by the activity data shared in real time and/or posted by users of the social network media; and a processing module comprising a processing unit, configured to process continuously for the time selected by the client the received activity data based on at least one pre-determined monitoring criterion selected by the client from a number of predetermined criteria, and a notification (Continued)

unit configured to send a notification to the client when the received activity data meet the selected monitoring criteria.

18 Claims, 4 Drawing Sheets

(56) References Cited

U.S. PATENT DOCUMENTS

| | | | |
|---|---|---|---|
| 2009/0327437 A1* | 12/2009 | Estrada | H04L 12/587 709/206 |
| 2010/0119053 A1* | 5/2010 | Goeldi | G06Q 10/00 379/265.09 |
| 2011/0161069 A1* | 6/2011 | Staffel | G06Q 10/00 704/9 |
| 2012/0036205 A1* | 2/2012 | Cole | G06Q 10/10 709/206 |
| 2012/0072358 A1* | 3/2012 | Famous | G06Q 30/01 705/319 |
| 2013/0144943 A1* | 6/2013 | Scissons | H04L 67/1095 709/204 |
| 2014/0164502 A1* | 6/2014 | Khodorenko | H04L 67/325 709/204 |

OTHER PUBLICATIONS

European Patent Office, Search Report in European Patent Application No. 13151951.4, dated Jul. 10, 2014.

\* cited by examiner

SYSTEM AND METHOD FOR CONTINUOUSLY MONITORING AND SEARCHING SOCIAL NETWORKING MEDIA

CROSS REFERENCE TO RELATED APPLICATIONS

This application is a continuation application of U.S. application Ser. No. 13/733,672, filed on Jan. 3, 2013, now U.S. Pat. No. 9,203,915, which is incorporated herein by reference.

BACKGROUND OF THE INVENTION

1. Field of the Invention

The present invention generally relates to social networking media. In particular, the present invention relates to a system and a method for continuously monitoring and searching activity data shared in real time and/or posted by an enormous number of users on one or more social networking media, such as for example social networks, forums, open chat, news website and blogs, or by media companies on on-line news outlets with the aim of providing information relevant for resolving emergencies, detecting criminal activities, conducting intelligence-related activities, saving lives and the like.

Social networking media have become a popular way for many individuals worldwide to socialize with each other. Typically, the social networking media allow social networking members to create their own online profile with data, pictures, videos and any other information and to communicate with each other by voice, chat, instant message, videoconferencing and so on. Therefore, social networking media provide a lot of information about their members.

Over the past decades, law enforcement officials have realized that a significant number of life threatening situations, criminal actions, terrorism-related and/or urgent issues have been reported on the social networking media, for example by using Facebook or Twitter messages.

It is therefore desirable to provide users, for example the law enforcement and homeland security agencies, with tools suitable for monitoring social networking media in order to detect information shared in real time and/or posted by the users of the social networking media, which are relevant for their activities and allow them to take actions to resolve emergencies, detect criminal activities and save lives.

It is also desirable to provide users with tools suitable for geo-locating and/or assessing the geographical relevance of the detected information, in order to prevent threatening situations, criminal actions, and the like reported in advance on social networking media.

2. Description of Related Art

Systems and methods are known in the art allowing a client, for example a parent, to control activity of one or more selected users, for example his/her child/children, on Internet-based social networking media, typically social networks. The client enter the account(s) of the user(s) whose activity he/she intends to control and selects one or more pre-established controlling criteria. The system notifies the client when the controlled activity meets at least one of the selected controlling criteria.

The above described systems and methods present some drawbacks. First, they allow to control activity of one or more users specified by the client and thus they are not suitable for being used to monitor the enormous number of data, for example messages, photos, etc., sent through the social networks by about tens of thousands or even millions of users. Second, they control the users' activity data already shared and/or posted by the selected users on the social networks and therefore they can not detect in real time relevant activity data, and thus prevent threatening situations and/or urgent issues reported on the Internet-based social networks.

BRIEF SUMMARY OF THE INVENTION

The technical problem underlying the present invention is therefore to provide a system and a method for monitoring and searching social networking media which allow to continuously detect activity data, for example messages, shared in real time and/or posted by users of social networking media and related to threatening situations and to notify in real time the client with the detected activity data.

Advantageously, the inventive system and method allow to geo-locate relevant activity data and/or to assess the geographical relevance of activity data in order to prevent threatening situations, criminal actions, and the like reported in advance on social networking media.

In the following description and in the claims, the expression "social networking media" designates Internet forums, web blogs, video and photo sharing communities (e.g. YouTube, Flickr, Instagram, etc.), social networks (e.g. Facebook, Twitter, MySpace, etc), mailing lists, newsgroups, RDD feeds, online media outlets, and the like.

In the following description and in the claims, the expression "activity data" designates all data which users share and/or post on the above defined social networking media, typically messages, photos, videos, position reports, and the like.

In the following description and in the claims, the expressions "selecting a time" and "selected time" indicate a time the duration of which can be selected from minutes, hours, days, months, years, or a not-specified length.

In the following description and in the claims, the terms "geo-locating", "geo-locate", "geo-located" are used to indicate not only the geographical location of relevant activity data (i.e. the definition of the geographical location from which the relevant activity data were sent), but also the geographical relevance of the detected activity data (i.e. for which location(s) the detected activity data can be relevant).

According to a first aspect thereof, the invention refers to a system for monitoring and searching social networking media as defined in the attached independent claim 1.

More particularly, the invention relates to a system for monitoring and searching social networking media, the monitoring and searching system being configured for allowing at least one client to access the monitoring and searching system and for connecting to at least one social networking media.

The monitoring and searching system is characterized in that it comprises:
  a connecting module comprising at least one connecting unit configured to connect to said at least one social networking media for receiving continuously for a time selected by a client activity data shared in real time and/or posted by users of said at least one social networking media; and
  a processing module comprising a processing unit configured to process continuously for the time selected by the client the received activity data based on at least one pre-determined monitoring and searching criterion selected by the client from a number of predetermined monitoring and searching criteria, and a notification unit configured to send a notification to the client when the received activity data meet said at least one selected monitoring and searching criterion.

The Applicant found that the monitoring and searching system of the invention advantageously allows the client to continuously monitor an enormous number of data, for example messages, photos, etc., shared in real time and/or posted by about tens of thousands or even millions of users through a number of social networking media, thus allowing the client to detect threatening situations and/or urgent issues reported in advance on the social networking media.

In a preferred embodiment, the connecting module further comprises a normalizing unit configured to convert the activity data which are received from each social networking media according to a specific Application Processing Interface into activity data normalized according to a generic Application Processing Interface. This advantageously allows the monitoring and searching system to effectively process activity data having one Application Processing Interface.

In a particularly preferred embodiment, the processing module further comprises a geo-locating unit configured to geo-localize the received activity data meeting the at least one monitoring and searching criterion. This advantageously allows the client to know in advance the location where a threatening situation could occur. At the same time, this allows the client (e.g. a law enforcement agency) to filter out activity data that do not have content relevant to their territory and/or that are not shared and/or posted within their territory and/or jurisdiction.

Preferably, the processing unit further comprises a user rating unit configured to perform a rating of the users of the social monitoring media based on the activity data they shared in real time and/or posted on the social networking media. This advantageously further increases effectiveness of the monitoring system. More preferably, rating can be based on user reliability to report valid and/or relevant content or situations.

Preferably, the processing module further comprises a reporting unit configured to make a report of the activity data satisfying said at least one selected monitoring criterion. More preferably, the report is in the form of evidence to use during legal proceedings.

Preferably, the at least one monitoring and searching criterion comprises: a semantic search based on keywords, a semantic search based on a Boolean expression, a face recognition criterion, an image recognition criterion, an automobile plate recognition criterion, a location search or a combination thereof.

Preferably, the notification unit is configured to send a notification to the client based on a notification mode previously selected by the client.

Preferably, the processing module further comprises a virtual patrolling unit configured to check-in into virtual locations to have detailed access of other people at the same place and their activity data from the social networking media.

In a preferred embodiment, the processing module further comprises a social video unit configured to search videos that are posted or streamed in real time by users of the social networking media.

According to a second aspect thereof, the present invention relates to a method for monitoring and searching social networking media as defined in attached independent claim 9.

More particularly, the invention relates to a method for monitoring and searching social networking media, the method comprising the following steps:
selecting at least one monitoring and searching criterion from a number of pre-determined monitoring and searching criteria;
selecting a time during which the monitoring and searching operations have to be carried out;
receiving continuously for the selected time activity data shared in real time and/or posted by users of said at least one social networking media;
processing continuously for the selected time the received activity data based on said at least one selected monitoring and searching criterion; and
sending a notification to the client when the received activity data meet said at least one selected monitoring and searching criterion.

The monitoring and searching method of the invention advantageously allows the client to continuously monitor and searching an enormous number of data, for example messages, photos, position reports, etc., shared in real time and/or posted by about tens of thousands or even millions of users through as number of social networking media, thus allowing the client to detect threatening situations and/or urgent issues reported in advance on the social networking media.

Preferably, the method comprises, after the receiving step, the further step of:
normalizing the activity data received from each social networking media according to a respective specific Application Processing Interface to obtain activity data normalized according to a generic Application Processing Interface.

In a preferred embodiment, the method comprises, before the step of sending a notification to the client, the step of performing a user rating, including the sub-steps of:
marking as not relevant activity data which although satisfying at least one monitoring and searching criterion are considered not relevant by the client; and
assigning a low weight selected from a predetermined weight scale to user by whom the activity data marked as not relevant has been shared and/or posted on the at least one social networking media.

Preferably, the step of sending a notification to the client comprises sending a notification according to a notification mode previously selected by the client from a predetermined list of notification modes.

Preferably, the step of selecting at least one monitoring and searching criterion from a number of pre-determined monitoring and searching criteria, comprises selecting at least one monitoring and searching criterion from a semantic search based on keywords, a semantic search based on a Boolean expression, a face recognition criterion, an image recognition criterion, an automobile plate recognition criterion, a location search or a combination thereof.

In a further preferred embodiment, the method comprises, before the step of sending a notification to the client, a further step of:
geo-locating the received activity data satisfying said at least one selected monitoring and searching criterion.

Preferably, the step of geo-locating the received activity data comprises the following sub-steps:
a) receiving a relevant message to be geo-located;
b) tokenizing and normalizing the received relevant message, to identify at least one token;

c) for each identified token, determining whether there is a match between the token and a list of locations stored in a local database and, if a match is found d) adding the location to user in the local database; and e) adding the location to the relevant message.

In a preferred embodiment, if a match is not found in step c), the method further comprises the following steps:

f) for each identified token, determining whether there is a match between the token and a list of locations stored in at least one database of alternative services available on the Internet; and if a match is found:

g) performing steps d) and e); and h) storing the identified location in the local database.

Preferably, the step b) of tokenizing and normalizing comprises the following sub-steps:

splitting the relevant message into individual words in small letters and separated by SPACE;

removing from the relevant message all punctuation marks and symbols (e.g. , ; - "' % # etc.); and removing from the relevant message the words considered not significant under a dictionary/black-list and the words shorter than 3 characters.

In a preferred embodiment, the method comprises after the step a) of receiving a relevant message to be geo-localized, the further steps of:

determining whether the user who shared and/or posted the relevant message is present in a local database; and if the user is present in the local database, performing the steps d) and e)

if the used is not present in the local database, adding the user to the local database; and performing steps b) to e) and steps f) to h).

In a preferred embodiment, the method comprises after the step a) of receiving a relevant message to be geo-localized, the further steps of:

determining whether the relevant message has latitude/longitude information associated thereto; and if latitude/longitude information is available, performing a geo-reversed search in the local database;

otherwise, performing steps b) to e) and steps f) to h).

In a particularly preferred embodiment, the method further comprises the steps of:

searching if the user who posted and/or shared the relevant message has a profile on a social networking media based on geo-localization; and if a profile is found, checking the check-in made by the user.

In a particularly preferred embodiment, the method further comprises the step of checking-in into virtual locations to have detailed access of other people at the same place and their activity data from the social networking media.

In a further preferred embodiment, the method further comprises the steps of:

searching videos posted or streamed in real time by users on social networking media; and providing the client with the video that are considered relevant.

Additional features and advantages of the invention will be better apparent from the following description of preferred embodiments of a system and a method for continuously monitoring and searching social networking media according to the present invention, which description is provided hereinafter for exemplifying and non-limiting purposes, with reference to the attached drawings. In the drawings:

DETAILED DESCRIPTION OF THE INVENTION

Figure 1:
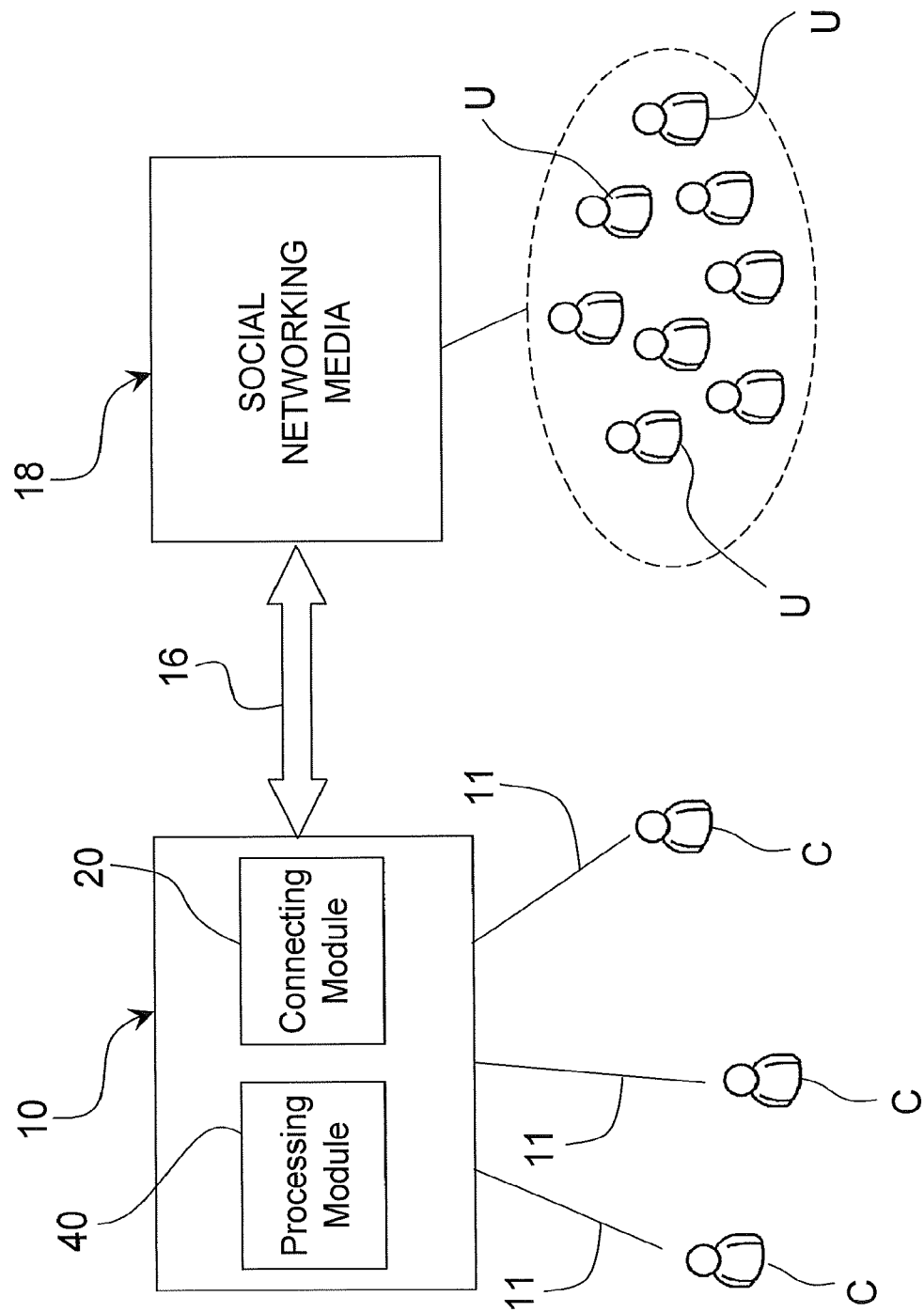
FIG. 1 is a schematic representation of a system for monitoring and searching social networking media according to an illustrative embodiment of the invention.

With reference to FIG. 1, it is schematically illustrated a system for monitoring and searching social networking media according to a preferred embodiment of the present invention.

The monitoring and searching system, generally designed with the reference number 10, is configured for allowing any number of clients C, for example an enforcement official, to access the monitoring and searching system 10 through a respective communication link 11 and for connecting, through a communication link 16, to one or more social networking media 18 to continuously monitor and search activity data shared in real time and/or posted by users U of the social networking media 18 in order to provide the clients C with information relevant for resolving emergencies, detecting criminal activities, conducting intelligence-related activities, and saving lives.

Advantageously, the inventive monitoring and searching system 10 is configured to process monitoring and searching operations from more clients C simultaneously.

The communication links 11 are, for example, a wired connection, a wireless connection or a combination thereof, established between a computer-based device of the client C and the monitoring system 10. Examples of computer-based devices that clients C may use to access the monitoring system 10 are, for example, personal computers, laptops, notebooks, tablets, smart phones and the like, that are generally capable of accessing the Internet.

The monitoring and searching system 10 comprises a connecting module 20 and a processing module 40.

The connecting module 20 is configured to connect to the social networking media 18 for receiving continuously for a time selected by the client C, through the connection link 16, activity data shared in real time and/or posted by users U of the social networking media 18.

The processing module 40 is configured to process continuously for the time selected by the client C the received activity data based on one or more pre-determined monitoring criteria selected by the client C and to send a notification to the client C when the received activity data meet at least one of the pre-determined monitoring criteria.

Figure 2:
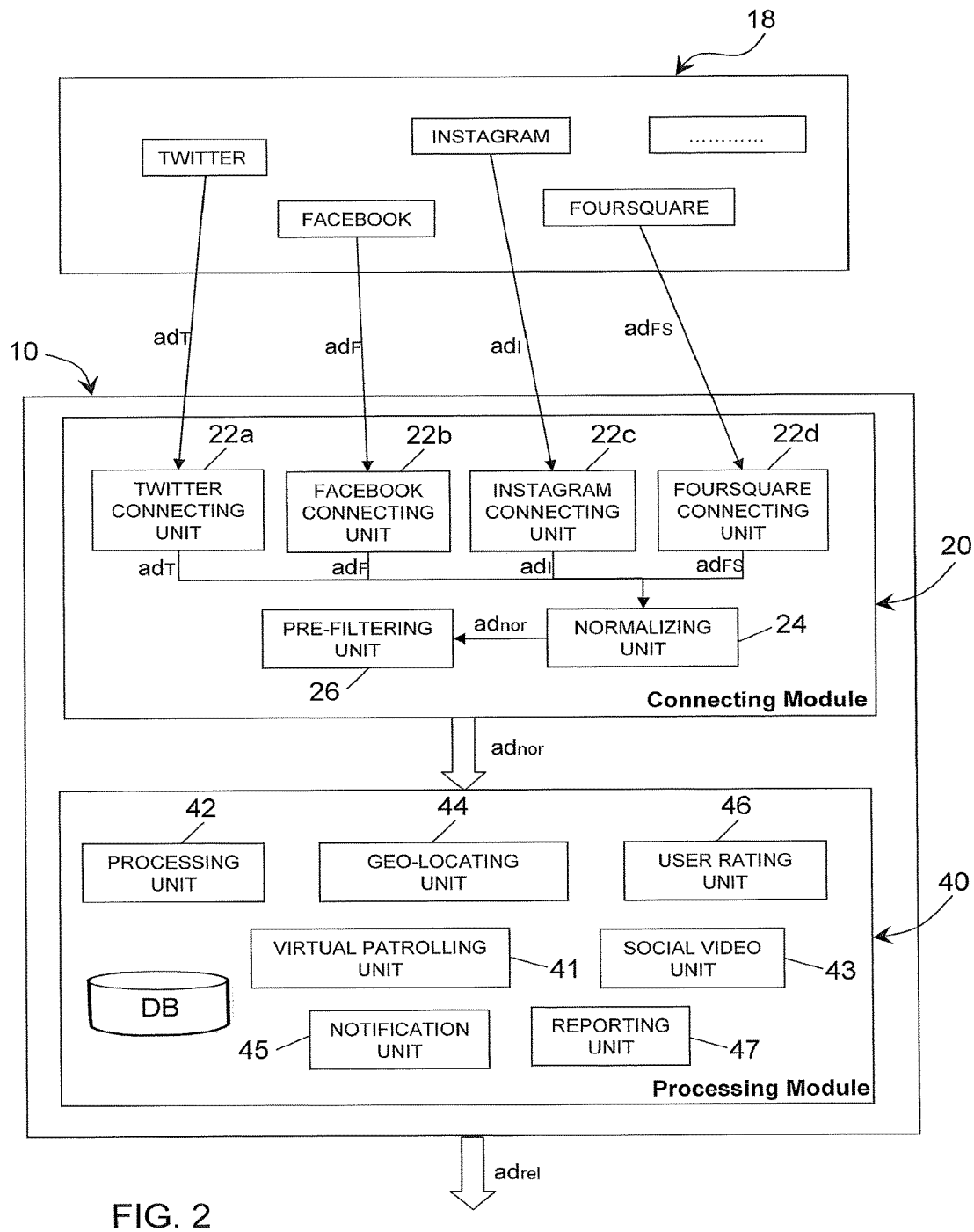
FIG. 2 is a block diagram illustrating in detail different components of the monitoring and searching system of FIG. 1.

With reference to FIG. 2, the connecting module 20 preferably comprises a plurality of connecting units 22*a*, 22*b*, 22*c*, 22*d* adapted to connect to a respective social networking media and to receive continuously for a time selected by the client C activity data shared and/or posted by users U of the social networking media.

In the embodiment shown in FIG. 2, the connecting units 22a, 22b, 22c, 22d comprise: a Twitter connecting unit 22a suitable for connecting to Twitter and for receiving activity data $ad_T$ shared and/or posted by the users of Twitter, a Facebook connecting unit 22b suitable for connecting to Facebook and for receiving activity data $ad_F$ shared and/or posted by the users of Facebook, an Instagram connecting unit 22c suitable for connecting to Instagram and for receiving activity data $ad_I$ shared posted by the users of Instagram, and a Foursquare connecting unit 22d suitable for connecting to Foursquare and for receiving activity data $ad_{FS}$ posted by the users of Foursquare.

The connecting module 20 further comprises a normalizing unit 24 configured to "normalize" or "standardize" the activity data $ad_T$, $ad_F$, adl, $ad_{FS}$ entering the respective connecting unit 22a, 22b, 22c, 22d coming from the corresponding social networking media 18.

As it is known, every social networking media transmits data according to its own specific API (Application Processing Interface) and restrictions. In other word, each social networking media stores data fields using slightly different identifiers. For example, one social networking media may store the user's identity in a field labelled "user" and another social networking media may store the same information in a field "userID" and still another social networking media may use the label "username".

Thus the normalizing unit 24 effectively standardizes non-standardized data fields from a plurality of social networking media 18 by using a common label or identifier and converts activity data, in the present embodiment activity data $ad_T$, $ad_F$, adl, $ad_{FS}$, received from the social networking media 18 according to their specific APIs into activity data $ad_{nor}$ normalized according to a generic API.

The processing module 40 comprises a processing unit 42 configured to process continuously for the time selected by the client C the normalized activity data $ad_{nor}$ coming from the connecting unit 20 based on at least one pre-determined monitoring and searching criterion previously selected by the client C from a number of predetermined monitoring and searching criteria.

Preferably, the monitoring and searching criteria comprise a semantic search based on one or more keywords. Specifically, the client C enters a list of keywords that he wants to be searched (e.g. bomb, attack, fire, etc.) and the processing unit 42 performs specific semantic searches on the normalized activity data $ad_{nor}$ looking for the keywords specified by the client C.

More preferably, the monitoring and searching criteria comprise a semantic search based on a Boolean expression. Specifically, the client C enters different keywords connected by a Boolean operator and the processing unit 42 performs specific semantic searches on the normalized activity data $ad_{nor}$ looking for the Boolean expression specified by the client C.

Preferably, the monitoring and searching criteria comprise a face recognition criterion. Specifically, the user C provides a specific image or a specific face to search for and the processing unit 42 starts searching for that specific image or for that specific face on all the social networking media including photo and video posting.

Preferably, the monitoring and searching criteria comprise a geographical location search. In fact, the officer in charge of a specific territory (e.g. city, neighbourhood, county, state, country, etc.) could be interested only in monitoring activity data, e.g. messages, coming from a specific location and/or having content relevant for that specific location.

To this end, the monitoring and searching system 10 further comprises a geo-locating unit 44, the operation of which will be described in detail in the following of the specification, with reference to FIG. 4.

Preferably, the processing unit 40 further comprises a user rating unit 46 configured for allowing the client C to mark as not relevant activity data, for example activity data $ad_{nor}$ which although satisfying the monitoring and searching criteria previously selected are not relevant for allowing the client C to detect criminal activities. The rating unit 46 is also configured to assign a low weight to users by which the activity data previously marked as not relevant have been shared and/or posted on the social networking media.

The user rating advantageously allows the monitoring and searching system 10 to perform a further screening of the activity data received by the social networking media, thus providing the client C only really interesting activity data.

Preferably, the processing unit 40 further comprises a notification unit 45 configured to generate an alarm when the monitoring system 10 finds activity data satisfying the selected pre-determined monitoring criteria, the notified activity data being eventually geo-localized if required.

Preferably, the processing unit 40 further comprises a reporting unit 47 configured to make a report on the relevant social networking data. The reporting unit 47 can be also configured to report activity data represented in the form of metadata or other data or file formats known in the art.

Preferably, the reporting unit 47 is also adapted to generate a report suitable for being used as evidence during legal proceeding.

Preferably, the processing module 40 further comprises a virtual patrolling unit 41 configured to check-in into virtual locations, such as bars, train stations, etc., to have detailed access of other people at the same place and their communications from the social media outlet, such as FourSquare. It is known that in social media like FourSquare and Facebook Places by checking-in at a particular location the user gets access to much more information regarding the other people at the same location and their communications. Therefore, advantageously, the monitoring and searching system 10 acts as a "virtual police officer", who visit each virtual location one after the other. It is understood that multiple "virtual officers" can operate at the same time to patrol a larger number of virtual locations and monitor the communications at each location.

In a preferred embodiment, the processing module 40 further comprises a social video unit 43 configured to search video(s) that are posted or streamed in real time by users U on the social networking media 18, e.g. uStream. Search can be performed on the text posted together with the video stream, based on the video content itself by using image and video processing techniques or based on the geographic relevance of the video or of the user who posted the video(s). The videos that are considered relevant for the client C are provided to the client C as a result of the searching and/or monitoring process.

Figure 3:
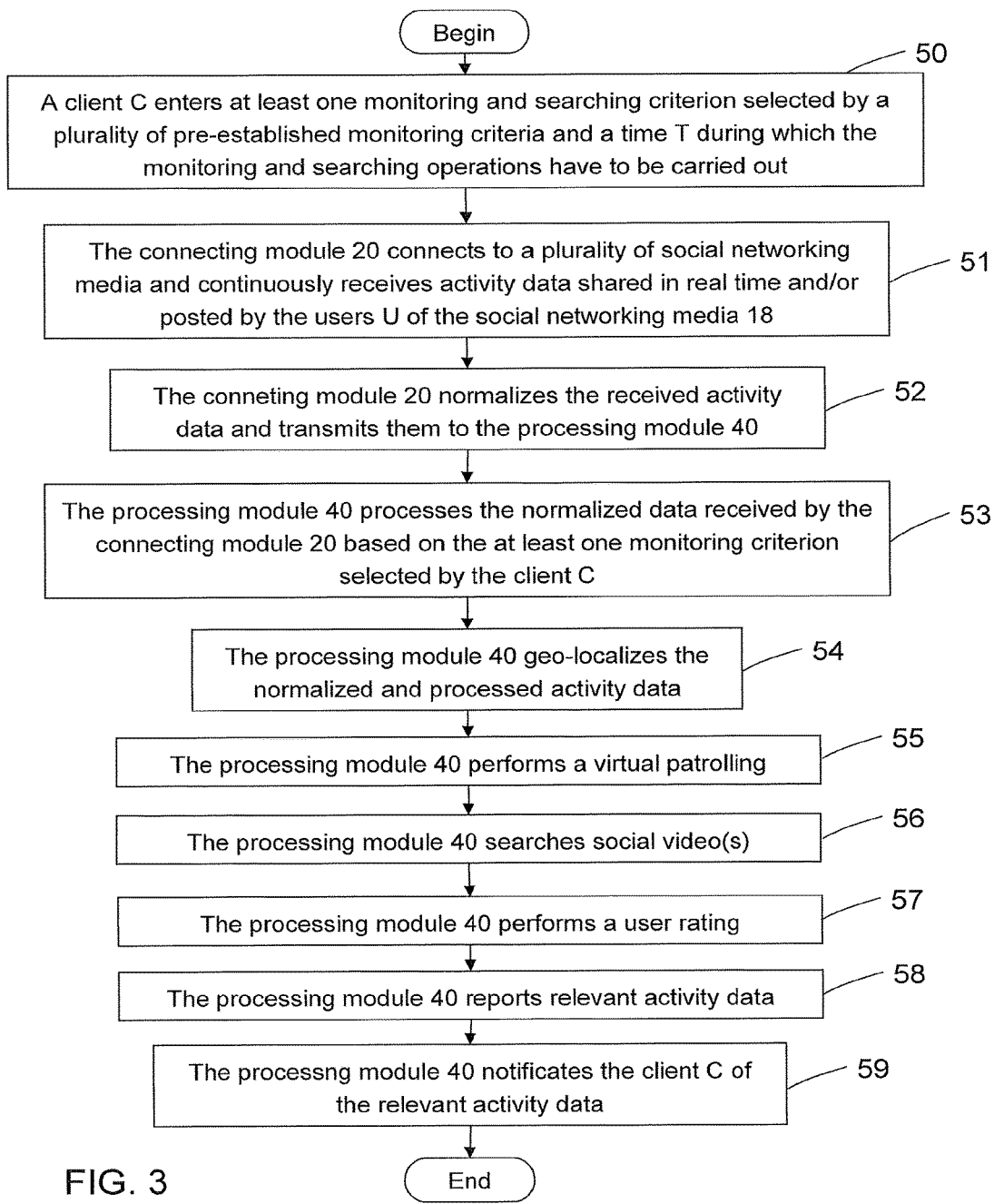
FIG. 3 is a flow-chart of an illustrative monitoring and searching method executed by the monitoring and searching system of FIGS. 1 and 2 for monitoring and searching social networking media to select relevant activity data and notifying the selected activity data to a client.

Referring now to FIG. 3, a flowchart is shown of one illustrative method executed by the monitoring and searching system 10 of FIGS. 1 and 2 for monitoring and searching social networking media.

The monitoring and searching method begins at step 50, where the client C connects to the monitoring system 10 by means of a respective computer-based device, e.g. a personal computer, a laptop, a notebook, a tablet, a smart phone and the like, and enters through the respective communication link 11 at least one monitoring and searching criterion selected from a plurality of pre-determined monitoring criteria and a time during which the monitoring and searching operations have to be carried out.

As described above, the monitoring and searching criteria selected by the client C at step 50 comprises: a semantic search based on one or more keywords, a semantic search based on a Boolean expression, a face recognition criterion, an image recognition criterion, an automobile plate recognition criterion, and a geographical location search.

As described above, the duration of time can be selected from minutes, hours, days, months, years, or a not-specified length. For example, the client C may decide the monitoring and searching system 10 has to run for hours or days or indefinitely. Alternatively, a search can also be triggered by a specific result or event. In this latter case, a social networking media 18 can be monitored based on a semantic search on keywords and in case a specific word is detected a search is carried out over the social networking media 18 to determine specific location or to collect images.

Preferably, one or more thresholds may also be established for any of the monitored activity data at step 50, such that a notification will be generated only if a threshold has been exceeded. For example, when the monitoring criterion consists of a semantic search based on keyword(s), a threshold may be established such that a notification is generated and sent to the client if the keyword(s) occurs more than x time, where x is any integer.

From step 50, the method advances to step 51, where the connecting module 20 of the monitoring and searching system 10 connects to a plurality of social networking media 18 for receiving continuously for the time selected by the client C the activity data shared in real time and/or posted by the users U of the social networking media 18.

Specifically, and with reference to FIG. 2, the Twitter connecting unit 22a connects to Twitter and continuously receives activity data $ad_T$ shared in real time and/or posted by the users of Twitter, the Facebook connecting unit 22b connects to Facebook and continuously receives activity data $ad_F$ shared in real time and/or posted by the users of Facebook, the Instagram connecting unit 22c connects to Instagram and continuously receives activity data $ad_I$ shared in real time and/or posted by the users of Instagram, and the Foursquare connecting unit 22d connects to Foursquare and continuously receives activity data $ad_{FS}$ shared in real time and/or posted by the users of Foursquare.

Then, the method advances from step 51 to step 52, where the connecting module 20, namely the normalizing unit 24 thereof, normalizes the activity data $ad_T$, $ad_F$, adI, $ad_{FS}$ received by each social networking media 18 according to a respective specific API, thus obtaining activity data $ad_{nor}$ according to a generic API. Advantageously, the normalized activity data $ad_{nor}$, being in a generic API, can be effectively processed by the processing module 40.

From step 52, the method proceeds to step 53, where the processing module 40, namely the processing unit 42 thereof, processes the normalized activity data $ad_{nor}$ coming from the connecting module 20, based on the one or more monitoring and searching criteria previously selected by the client C.

Preferably, the monitoring and searching method provides a pre-filtering step 51 a performed by the connecting module 20, namely by a pre-filtering unit 26 thereof, before the steps 51 and 52 described above. The pre-filtering unit 26 may filter the activity data based on at least one monitoring and searching criterion previously selected by the client C. For example, the pre-filtering unit 26 may pre-filter the activity data by performing a semantic search based on keyword(s) or based on a Boolean expression.

In the event the activity data have to be localized, the monitoring and searching method provides a step 54 where the processing module 40, namely the geo-locating unit 44 thereof, geo-locates the activity data $ad_{nor}$, as it will be described in greater detail below with reference to FIG. 4.

Preferably, the monitoring and searching method proceeds to step 55, where the processing module 40, namely the virtual patrolling unit 41 thereof, check-ins into virtual locations (e.g. bars, train stations, etc.) to have detailed access to other people at the same place and their activity data from the social networking media 18 (e.g. FourSquare).

Preferably, the monitoring and searching method proceeds to step 56, where the processing module 40, namely the social video unit 43 thereof, searches video(s) that are posted or streamed in real time by users U on the social networking media 18, e.g. uStream. Specifically, such a search can be performed on the text posted together with the video stream, based on the video content itself by using image and video processing techniques or based on the geographic relevance of the video or of the user who posted the video(s). The videos that are considered relevant for the client C are provided to the client C as a result of the searching and/or monitoring process.

Preferably, the monitoring and searching method proceeds from to step 57, where the processing module 40, namely the user rating unit 46 thereof, performs a user rating.

More specifically, step 57 might include the following sub-steps:

the client C marks as not relevant activity data $ad_{nor}$ which although meeting the monitoring criteria previously selected, he considers not relevant; and the user rating unit 46 assigns a low weight, selected from a predetermined weight scale, to user U by which the activity data marked as not relevant has been shared and/or posted on the social networking media.

Preferably, the method proceeds to step 58, where the processing module 40, namely the reporting unit 47 thereof, reports relevant activity data. For example, relevant activity data may be represented in the form of metadata or other data or file formats known in the art. More preferably, the report may be in a form suitable for being used as evidence during legal proceeding.

Finally, the method proceeds to step 59, where the processing module 40, namely the notification unit 45 thereof, notifies the client C with the relevant activity data, according to a notification mode previously selected by the client C. Examples of notification modes include, but are not limited to, e-mail, SMS, WAP, RSS and the like. Illustratively, the client C may select one or more combination of these notification modes.

Figure 4:
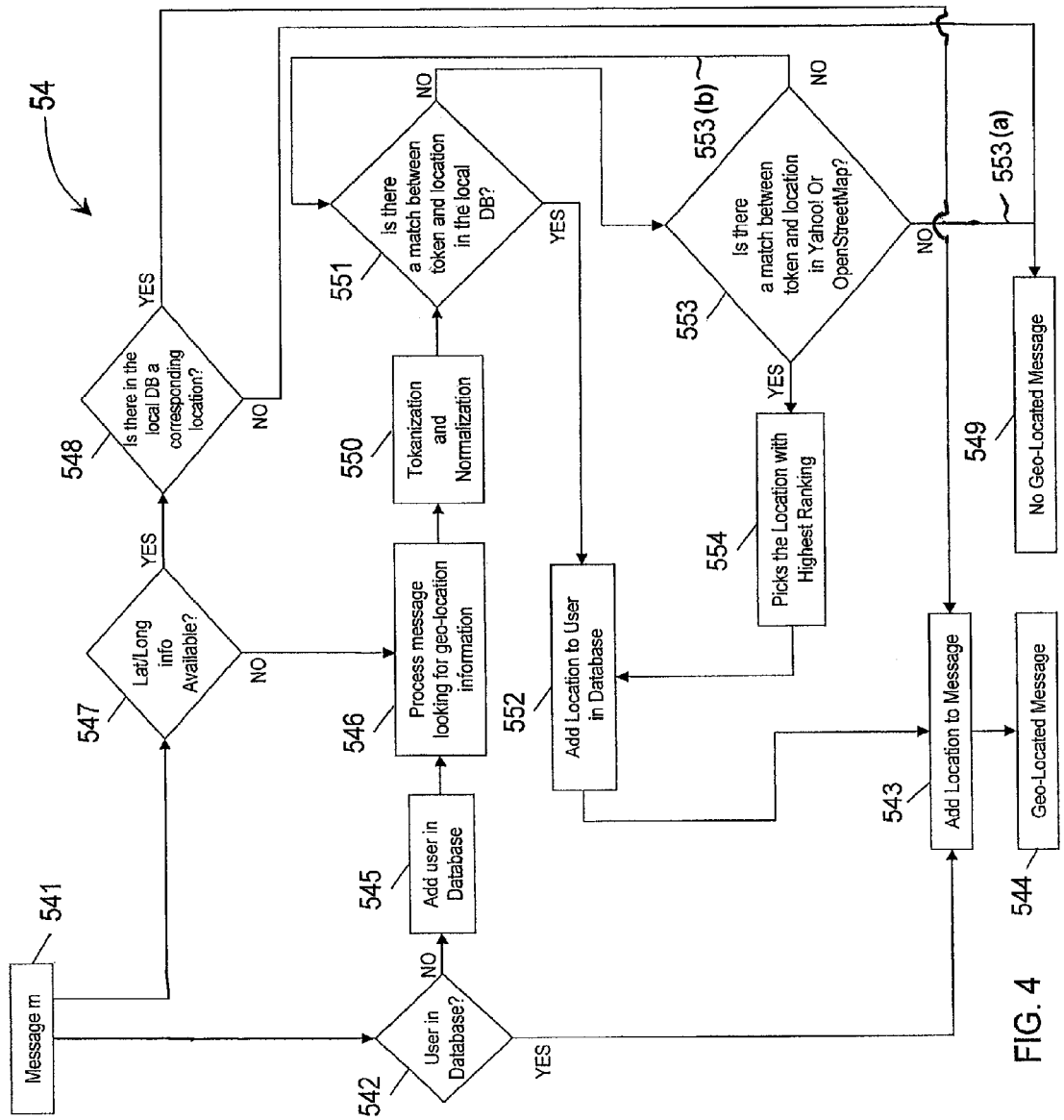
FIG. 4 is a flow-chart of an illustrative method executed by the monitoring and searching system of FIGS. 1 and 2 for geo-localizing the selected relevant activity data.

Referring now to FIG. 4, a flowchart is shown of one illustrative method 54 executed by the monitoring and searching system 10 of FIGS. 1 and 2 for geo-locating relevant activity data, specifically a message m shared in real time and/or posted by a user U and identified as relevant by the monitoring system 10.

As described above, relevant activity data are considered to be geo-located when the geographical location and/or the geographical relevance thereof is determined.

The geo-locating method 54 begins at step 541, where the geo-locating unit 44 of the processing module 40 receives the message m to be geo-localized.

The method 54 proceeds to both step 542, where the geo-locating unit 44 determines whether the user U is present in a local database DB of the monitoring and searching system 10, and also to step 547 which is described in the detail later. If the user U is present in the local database DB, geo-locating information is available and the method 54 proceeds to step 543 where the geo-locating unit 44 adds the location information to the message m. Therefore, the message m is geo-localized (step 544).

If the user U is not present in the local database DB, the method 54 proceeds to step 545 where the user U is added to the local database DB, and to step 546 where the geo-locating unit 44 processes the message m looking for geo-location information.

At step 547, the geo-locating unit 44 determines whether the message m has latitude/longitude information associated thereto. If latitude/longitude information is not available, the method proceeds to step 546 where the geo-locating unit 44 processes the message m looking for geo-location information. If latitude/longitude information is not available, the method proceeds to step 548 where the geo-locating unit 44 performs a geo-reversed search in the local database DB. In other words, the geo-locating unit 44 determines whether a bounding box containing the latitude/longitude information exists. If a bounding box exists the geo-locating unit 44 adds the location to message (step 543), i.e. place the message m in the bounding box, and thus geo-localizes the message m (step 544). Otherwise the message m is not geo-localized (step 549).

From step 546, the method proceeds to step 550 where the message m is subjected to tokenization and normalization thus obtaining one or more tokens.

Specifically, in step 550, the geo-locating unit 44:

a) splits the message m into individual words in small letters and separated by SPACE;

b) removes from the message m all punctuation marks and symbols (e.g. , ; - "" % # etc.); and c) removes the words not considered significant under a dictionary/black-list and the words shorter than 3 characters, thus identifying one or more token.

From step 550 the method proceeds to step 551, where for matching is performed for each one of the tokens identified in step 550. The geo-locating unit 44 determines if there is a match between one of the tokens and a list of locations stored in the local database DB. If a match is found, latitude/longitude information, i.e. a bounding box containing those latitude and longitude, are available. Moreover, the geo-locating unit 44 adds the location to user U in the local database DB (step 552), adds location to message m (step 543), i.e. place the message m in the relevant bounding box, and thus geo-localizes the message m (step 544).

If a match is not found at step 551, the geo-locating unit 44 determines whether there is a match between the same one of the tokens and a list of locations stored in databases of alternative services available on the web, for example Yahoo! or OpenStreetMap (step 553). If a match is not found (e.g., NO at step 551) and matching has not been performed on at least one other of the tokens identified in step 550, processing is repeated for one of the other tokens as indicated by the flow 553(b). Otherwise, if all tokens identified in step 550 have been processed and a match is not found for all tokens, processing continues as indicated by the flow 553(a) to step 549 which is explained later. If a match is found at step 551, the results obtained by the services are analyzed and the location with highest ranking is selected, based on a plurality of predetermined threshold. Moreover, the geo-locating unit 44 adds the location to user U in the local database DB (step 552), adds location to message m (step 543) and geo-locates the message m (step 544).

Preferably, starting from the selected location, the geo-locating unit 44 performs a recursive search in the local database DB of the monitoring and searching system 10 to obtain the bounding box hierarchy for the selected location.

Preferably, all data retrieved by services are subsequently stored in the local database DB of the monitoring and searching system 10.

If more identified tokens matches with a respective location stored in the local database DB of the monitoring and searching systems 10 or in the databases of Yahoo! or OpenStreetMap, before adding the location to user U in the database DB (step 552), the geo-locating unit 44 picks the location with highest ranking (step 554).

If none of the identified tokens matches with a respective location stored in the local database DB of the monitoring systems 10 or in the databases of Yahoo! or OpenStreetMap, the message m is not geo-located (step 549).

It is assumed, for example, that the relevant message m to be geo-located recites "I'll see you in front of the restaurant in Milan".

Following the above geo-locating method 54, the geo-locating unit 44 identifies the word "Milan" as a token (step 550) and determines if a match exists between "Milan" and a list of locations stored in the local database DB of the monitoring and searching system (step 551) or, if such a match is not found, in a list of locations in databases of Yahoo! or OpenStreetMap (step 553).

It is assumed that a match if found between "Milan" and a location stored in the local database DB of the monitoring and searching system 10 (step 550, YES). Thus, a bounding box corresponding to Milan is present in the database. Therefore, the geo-locating unit adds location to user in the local database DB (step 552) and geo-locates the message m by placing the message m in the bounding box (step 544). The message m is thus effectively geo-located (step 544).

By way of a further example, it is now assumed that the message to be geo-located recites "I'll see you in Manzoni street" and that the user who posted the message lives in Como.

Following to the above geo-locating method 54, the geo-locating unit 44 identifies the word "Manzoni street" as a token (step 550) and determines if a match exists between "Manzoni street" and a list of locations stored in the local database DB of the monitoring system (step 551) or, if such a match is not found, a list of locations in databases of Yahoo! or OpenStreetMap (step 553).

It is assumed that a match if found between "Manzoni street" and a plurality of locations, for example Milan and Rome, stored in the database of Yahoo! (step 552, YES). Thus, the geo-locating unit 44 generates a pair of bounding box, a bounding box containing the latitude/longitude information of Milan and a bounding box containing the latitude/longitude information of Rome. Subsequently, the geo-locating unit 44 adds locations to user in the local database DB and geo-locates the message by placing the message m in both the bounding boxes. Therefore the message m is not univocally geo-located.

In order to increase the probability of geo-location of the message m, the monitoring and searching method 10 searches if the user who posted the message m has a profile on a social networking media based on geo-localization, namely Foursquare. As it is known, FourSquare is a social network based on geo-locating. In particular, a user makes a check-in corresponding to the location where he is in a moment.

Indeed, if the user who has posted the relevant message m has a corresponding profile on Foursquare, the monitoring and searching system 10 can control the check-in made by the user, for example in the last days, with the aim of effectively geo-locating the message m.

In addition or alternatively, the monitoring and searching system and method of the invention allow the determination of the geographical relevance of relevant activity data. In other words, the system and method allows a bounding box to be placed to cover all the places relevant to geo-locate the message. In the example described above, a bounding box is positioned to cover Como, Rome, Milan and location where the user has made the last check in, for example Florence.

Clearly, one skilled in the art may introduce modifications and variants to the invention described hereinbefore in order to meet specific and contingent application requirements, variants and modifications which anyway fall within the scope of protection as defined in the attached claims.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A system for searching at least one social networking media, the system comprising:
   a processor configured to:
   receive data provided by a plurality of users of the at least one social networking media, and identify one or more video streams included in the received data if texts posted with the one or more video streams satisfy at least one predetermined criterion;
   output the one or more video streams for display when the texts posted with the one or more video streams satisfy the at least one predetermined criterion; and
   geo-locate, based on the one or more video streams satisfying the at least one predetermined criterion, to indicate at least one geographical location from which the one or more video streams were sent and at least one geographical location relevant to the one or more video streams.

2. The system according to claim 1, wherein the one or more video streams are displayed in the form of a report which is in the form of evidence suitable for use during a legal proceeding.

3. The system according to claim 1, wherein the at least one predetermined criterion comprises at least one of:
   a semantic search based on keywords; and
   a semantic search based on a Boolean expression.

4. The system according to claim 1, wherein the processor is configured to geo-locate by performing the steps of:
   a) receiving a relevant message from one of the users to be geo-localized, the relevant message comprising activity data that is either shared in real time by the one of the users or posted by the one of the users;
   b) tokenizing and normalizing the received relevant message, to identify at least one token;
   c) for each identified token, determining whether there is a match between the token and an entry in a list of locations stored in a local database; and
   when a match is found:
   d) adding the location matching the token to an entry associated with information of the one of the users in the local database; and
   e) adding the matching location entry to the relevant message.

5. The system according to claim 4, wherein the processor is configured to geo-locate by further performing the steps of:
   when a match is not found:
   f) for each identified token, determining whether there is a match between the token and an entry in a list of locations stored in at least one database of alternative services available on the Internet; and
   when a match is found in the at least one database of alternative services:
   g) performing steps d) and e); and
   h) storing the matching location entry in the local database.

6. The system according to claim 5, wherein the processor is configured to geo-locate by further performing the steps of:
   determining whether information of the one of the users is present in the local database; and
   when information of the one of the users is present in the local database:
   adding the location entry to the relevant message; and
   geo-localizing the relevant message;
   when information of the one of the users is not present in the local database:
   adding the one of the users to the local database; and
   performing steps b) through h).

7. The system according to claim 5, wherein the processor is configured to geo-locate by further performing the steps of:
   determining whether the relevant message has associated latitude/longitude information; and
   when latitude/longitude information is associated, performing a geo-reversed search in the local database;
   when no latitude/longitude information is associated, performing steps b) through h).

8. The system according to claim 4, wherein the processor is configured to geo-locate by further performing the steps of:
   determining if the one of the users associated with the relevant message has a profile on the at least one social networking media based on geo-localization; and
   if a profile is found, controlling a virtual location check-in made by the one of the users.

9. The system according to claim 1, wherein the at least one geographical location relevant to a first one of the one or more video streams includes at least one location different from the at least one geographical location from which the first one of the one or more video streams was sent.

10. In a system for searching at least one social networking media, a method comprising:
    receiving data provided by a plurality of users of the at least one social networking media, and identifying one or more video streams included in the received data if texts posted with the one or more video streams satisfy at least one predetermined criterion;
    outputting the one or more video streams for display when the texts posted with the one or more video streams satisfy the at least one predetermined criterion; and
    geo-locating, based on the one or more video streams satisfying the at least one predetermined criterion, to indicate at least one geographical location from which the one or more video streams were sent and at least one geographical location relevant to the one or more video streams.

11. The method according to claim 10, further comprising the step of:

displaying the one or more video streams in the form of a report which is in the form of evidence suitable for use during a legal proceeding.

12. The method according to claim 10, wherein the at least one predetermined criterion comprises at least one of:
 a semantic search based on keywords; and
 a semantic search based on a Boolean expression.

13. The method according to claim 10, wherein the step of geo-locating comprises the steps of:
 a) receiving a relevant message from one of the users to be geo-localized, the relevant message comprising activity data that is either shared in real time by the one of the users or posted by the one of the users;
 b) tokenizing and normalizing the received relevant message, to identify at least one token;
 c) for each identified token, determining whether there is a match between the token and an entry in a list of locations stored in a local database; and
 when a match is found:
 d) adding the location matching the token to an entry associated with information of the one of the users in the local database; and
 e) adding the matching location entry to the relevant message.

14. The method according to claim 13, wherein the step of geo-locating further comprises the steps of:
 when a match is not found:
 f) for each identified token, determining whether there is a match between the token and an entry in a list of locations stored in at least one database of alternative services available on the Internet; and
 when a match is found in the at least one database of alternative services:
 g) performing steps d) and e); and
 h) storing the matching location entry in the local database.

15. The method according to claim 14, wherein the step of geo-locating further comprises the steps of:
 determining whether information of the one of the users is present in the local database; and
 when information of the one of the users is present in the local database:
 adding the location entry to the relevant message; and
 geo-localizing the relevant message;
 when information of the one of the users is not present in the local database:
 adding the one of the users to the local database; and
 performing steps b) through h).

16. The method according to claim 14, wherein the step of geo-locating further comprises the steps of:
 determining whether the relevant message has associated latitude/longitude information; and
 when latitude/longitude information is associated, performing a geo-reversed search in the local database;
 when no latitude/longitude information is associated, performing steps b) through h).

17. The method according to claim 13, wherein the step of geo-locating further comprises the steps of:
 determining if the one of the users associated with the relevant message has a profile on the at least one social networking media based on geo-localization; and
 if a profile is found, controlling a virtual location check-in made by the one of the users.

18. The method according to claim 10, wherein the at least one geographical location relevant to a first one of the one or more video streams includes at least one location different from the at least one geographical location from which the first one of the one or more video streams was sent.

* * * * *